US007515231B2

(12) United States Patent
Hale et al.

(10) Patent No.: US 7,515,231 B2
(45) Date of Patent: Apr. 7, 2009

(54) LOW TEMPERATURE NEMATIC LIQUID CRYSTAL ALIGNMENT MATERIAL AND LCD COMPENSATOR INCORPORATING THE LIQUID CRYSTAL ALIGNMENT MATERIAL

(75) Inventors: Leonard G. Hale, Cambria, CA (US); Young J. Chung, Calabasas, CA (US); William J. Gunning, III, Newbury Park, CA (US)

(73) Assignee: Teledyne Scientific & Imaging, LLC, Thousand Oaks, CA (US)

( * ) Notice: Subject to any disclaimer, the term of this patent is extended or adjusted under 35 U.S.C. 154(b) by 491 days.

(21) Appl. No.: 11/241,070

(22) Filed: Sep. 30, 2005

(65) Prior Publication Data

US 2007/0076150 A1 Apr. 5, 2007

(51) Int. Cl.
*G02F 1/1335* (2006.01)
(52) U.S. Cl. .......................... 349/117; 349/96; 349/127
(58) Field of Classification Search ................. 349/117, 349/126, 127, 179, 183, 86, 88, 96, 158, 349/138, 125
See application file for complete search history.

(56) References Cited

U.S. PATENT DOCUMENTS

| | | | |
|---|---|---|---|
| 4,561,725 A | 12/1985 | Hotta | |
| 4,802,740 A | 2/1989 | Hotta et al. | |
| 5,196,953 A | 3/1993 | Yeh et al. | |
| 5,373,380 A | 12/1994 | Harada et al. | |
| 5,504,603 A | 4/1996 | Winker et al. | |
| 5,557,434 A | 9/1996 | Winker et al. | |
| 5,589,963 A | 12/1996 | Gunning, III et al. | |
| 5,612,801 A | 3/1997 | Winker | |
| 5,619,352 A * | 4/1997 | Koch et al. | 349/89 |
| 5,631,051 A | 5/1997 | Ito | |
| 5,638,197 A | 6/1997 | Gunning, III et al. | |
| 5,731,886 A | 3/1998 | Taber et al. | |
| 5,830,953 A | 11/1998 | Nishikawa et al. | |
| 6,726,965 B2 | 4/2004 | Ito et al. | |
| 7,301,594 B2 * | 11/2007 | Yu et al. | 349/120 |
| 2004/0032546 A1 | 2/2004 | Ito | |
| 2004/0156000 A1 | 8/2004 | Roska et al. | |
| 2006/0055855 A1 * | 3/2006 | Duz et al. | 349/117 |

OTHER PUBLICATIONS

Ha, KiRyong, "Incorporation of Perfluorinated Moiety to Alignment Materials and their Effects on the Liquid Crystal Orientations", ASI $3^{rd}$ (Jul. 25-31, 2004).
Jessica Merlin et al., "All-optical switching in a nematic liquid crystal twist cell", *Optics Express*, vol. 13, No. 13, pp. 5024-5029 (Jun. 27, 2005).
Valery Vorflusev et al., "Phase Separated Composite Films of Liquid Crystals", *PRAMANA Journal of Physics*, vol. 53, No. 1, pp. 121-129 (Jul. 1999).

* cited by examiner

*Primary Examiner*—Thoi V Duong
(74) *Attorney, Agent, or Firm*—Koppel, Patrick, Heybl & Dawson; Michael J. Ram (57) ABSTRACT

An anisotropic cross-linked PVA alignment layer for aligning nematic polymeric liquid crystal compensator films, which also provides an out-of-plane retardation. The cross-linked PVA alignment layer, when applied in sufficient thickness functions as both a negative uniaxial C-plate and causes alignment of the nematic liquid crystal molecules. The combination of the retardation provided by the alignment layer and the compensator film deposited on it provides a significant improvement in the contrast and color stability of liquid crystal displays (LCDs) at large viewing angles in which they are used.

44 Claims, 8 Drawing Sheets

LOW TEMPERATURE NEMATIC LIQUID CRYSTAL ALIGNMENT MATERIAL AND LCD COMPENSATOR INCORPORATING THE LIQUID CRYSTAL ALIGNMENT MATERIAL

FIELD OF THE INVENTION

This invention relates to an anisotropic cross-linked polyvinyl alcohol (PVA) alignment layer for fabricating nematic liquid crystal compensator films for use in liquid crystal displays (LCDs). The film has an out-of-plane optical phase retardation, allowing it to also function as a negative birefringent substantially uniaxial C-plate compensation film.

BACKGROUND

Liquid crystal displays (LCDs) are used to display information by utilizing the effect that the optical birefringence of the liquid crystal layer has on the polarization of light that is transmitted through said layer. By applying a voltage across the liquid crystal layer, the orientation of the liquid crystal molecules is modified, changing the optical symmetry and hence optical retardation of the liquid crystal layer. This in turn modifies the polarization of the transmitted light. When the liquid crystal layer is positioned between two polarizing films, the change in polarization of the transmitted light is resolved into a difference in transmitted intensity. In this way, information is displayed on a liquid crystal display by spatially modulating the voltage on the liquid crystal, effectively changing individual spatial elements, or pixels, from transmitting to absorbing the incident light. Liquid crystal displays are made in a multitude of configurations including transmissive, being illuminated from behind by a separate light source, and reflective, whereby the ambient light that is incident on the front of the display is reflected by a layer behind the liquid crystal and intensity resolved upon passing through the single entrance/exit polarizer on the viewing surface. Liquid crystal displays have advantages over other display media in that they can display information with much lower power consumption than emissive displays, such as plasma displays. Thus, LCD's are used in display devices such as wristwatches, pocket and personal computers, calculators, aircraft cockpit displays, etc. The very long operational life in combination with very low weight and low power consumption of LCD's, along with other design advantages, have particular utility in these applications. See U.S. Pat. No. 5,612,801, incorporated herein by reference, provides an overview of LCD technology.

Liquid crystal displays exist in a multitude of embodiments depending upon the specific type of liquid crystal material and the configuration of the polarizers and electrodes. In its simplest form, a typical LCD comprises a liquid crystal cell, situated between two polarizer layers, the second polarizer layer commonly referred to as the analyzer layer. Many such liquid crystal displays exhibit optical performance that is very sensitive to the angle at which the display is viewed. Contrast, gray level stability, and color stability often change significantly as the view angle deviates from normal, or zero degrees. This viewing angle behavior arises because the optical symmetry of the liquid crystal layer is such that when the liquid crystal is electrically aligned to produce a specific transmission level at normal viewing, the angle dependence of the optical retardation through the liquid crystal layer causes the transmission at off-normal viewing to be either higher or lower than the commanded transmission at zero degrees. This can severely limit the use of LCDs in many desirable applications. Optical compensation films, also referred to as compensators or retarders, are commonly used to mitigate the viewing angle effects in LCDs, the specific design and geometry being dependent on the type of LCD employed.

A retarder, or compensator, denotes a film or plate-like birefringent optical element for which the refractive index along at least one of the optical axes is different from the other two. If the three refractive indices are different the material is called biaxial. If two of the indices are the same with the third being different the material is uniaxial. Further, a uniaxial material can have either positive or negative birefringence depending on whether the refractive index for light polarized normal to the uniaxial optical axis is less or greater than the refractive index for light that has a polarization component parallel to the optical axis respectively.

In the ideal case, an optical compensator is designed to have an angle dependence that is complementary to that of the liquid crystal layer, thus canceling, or compensating for the angle dependence of the liquid crystal. The angle dependence is not exactly complementary because the geometry and symmetry of the liquid crystal film varies as it is electrically driven to its various transmission state orientations. The objective of a compensator design is to provide the best overall optical effect throughout the full transmission range of the liquid crystal display. The uses of such compensators have been disclosed in U.S. Pat. No. 5,196,953 (Yeh et al.), U.S. Pat. No. 5,504,603 (Winker et al.), U.S. Pat. No. 5,557,434 (Winker et al.), U.S. Pat. No. 5,589,963 (Gunning, III et al.), U.S. Pat. No. 5,619,352 (Koch et al.), U.S. Pat. No. 5,612,801 (Winker) and U.S. Pat. No. 5,638,197 (Gunning, III et al.). This application is directed to a class of compensator materials and assembled structures that are useful for twisted nematic (TN), vertically aligned (VA), and potentially other active matrix displays.

Compensators can be placed between the polarizer and the liquid crystal cell, between the analyzer and the liquid crystal cell, or in both locations. With the addition of one or more compensator layers, the contrast ratio and grey level stability is improved over a wide range of viewing angles by careful design so the compensator, which may include multiple layers of birefringent materials each having different thicknesses, optical axis orientation with respect to the liquid crystal and polarizer angles, or sign of birefringence.

Figure 1:
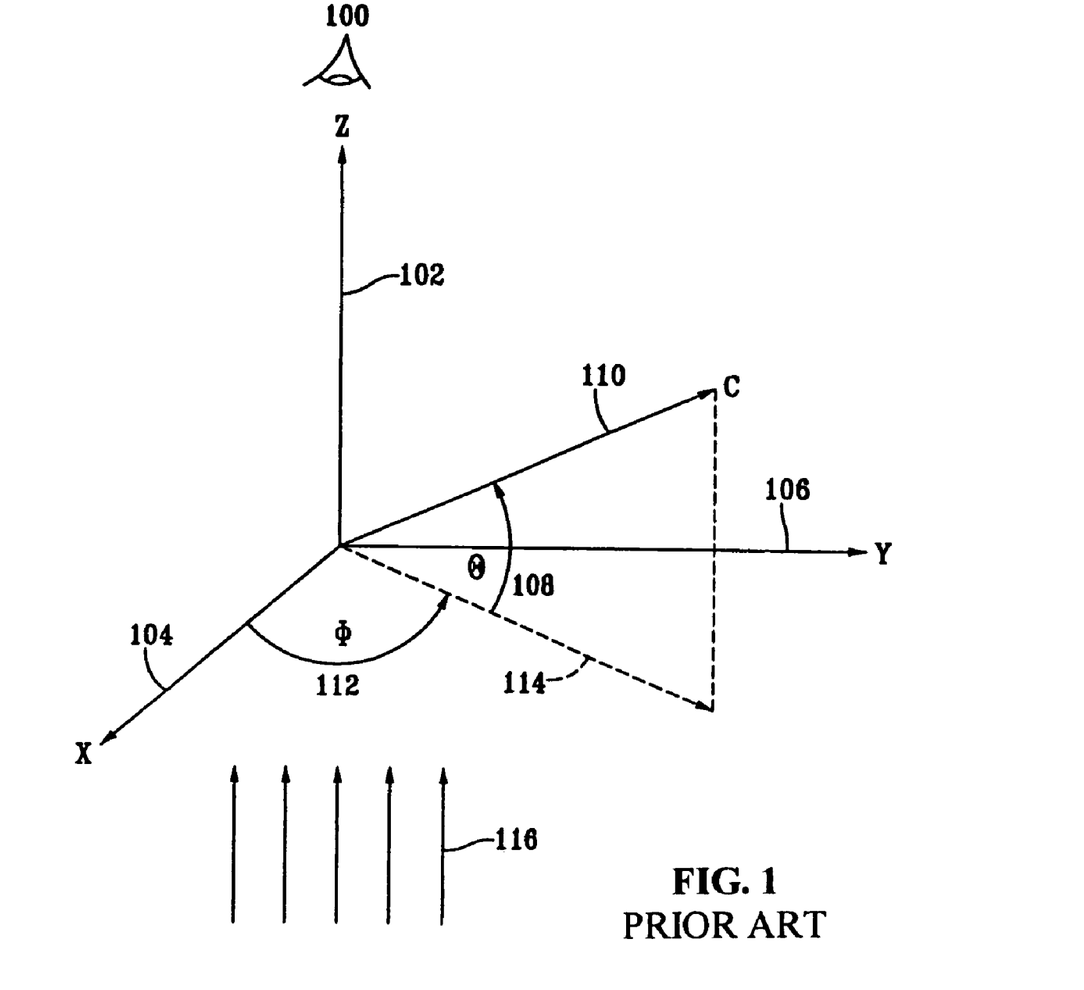
FIG. 1 depicts a three-dimensional coordinate system that is used to specify component orientations in the description of this invention.

FIG. 1 depicts a coordinate system, which is used to describe the orientation of both liquid crystal and birefringent compensator optic axes. Light 116 propagates toward the viewer 100 in the positive z direction 102, which, together with the x-axis 104 and the y-axis 106, forms a right-handed coordinate system. The polar tilt angle Θ 108 is defined as the angle between the liquid crystal molecular optic axis (c-axis) 110 and the x-y plane, measured from the x-y plane. The azimuthal angle Φ 112 is measured from the x-axis to the projection 114 of the optic axis onto the x-y plane.

Compensator films comprise either stretched films of polymer materials, or coated films of materials having significant optical anisotropy. Stretched polymer films typically are made from polyvinyl alcohol, polystyrene, or polycarbonate. Their primary applications are in passive matrix super twist nematic (STN) displays. Stretched PVA films have an optical axis orientation in the stretch direction, parallel to the surface of the film, and exhibit positive birefringence. Other materials have similar in-plane optical axis orientation but with a negative birefringence. This in-plane optical symmetry is commonly referred to as "A-plate". Stretched films are widely used but suffer from retardation non-uniformity and are affected by high temperatures which may be encountered in certain display applications. They are also limited in the range of achievable optical symmetries and therefore cannot adequately address the requirements of many high performance LCDs.

An alternative approach for LCD compensation films uses films of polymerized liquid crystals. These may be films of liquid crystal polymers that are melt cast onto a suitable substrate and then solidify upon cooling, or films of polymerizable liquid crystal materials, commonly described as reactive mesogens, provided in a solvent and formed into films, dried, and then polymerized either using photopolymerization or thermal polymerization. The liquid crystal films may consist of nematic (rod-like) liquid crystal molecules, having positive birefringence, or discotic (disk-shaped) liquid crystals, having negative birefringence. The substrates for these films are prepared by various means to induce the desired alignment or orientation of the liquid crystal molecules in the film. The most common method for achieving this alignment is to gently rub the surface of a suitable alignment layer using a rayon cloth. Alternatively, alignment may be induced by photoalignment where a preferred orientation direction is imparted through the interaction with linearly polarized ultraviolet light. Further, the liquid crystal coating solution may also be modified to provide a range of optical symmetries within the liquid crystal layer, for example by the addition of a chiral component to a nematic solution to produce a twist in the orientation of the molecules in the film or to modify the orientation of the liquid crystal at the air interface.

Liquid crystal films may have a multitude of optical symmetries. For example, nematic films may be formed in the following symmetries:

For an A-plate the liquid crystal molecules are all oriented parallel to each other and in the plane of the film, the direction of the long axes of the molecules determining the optical axis direction. There may be a very small tilt of a few degrees between the substrate and the first layer of molecules, but the molecules at the air interface are oriented substantially parallel to the interface.

O-plate compensator films are formed using nematic liquid crystals, but the average value of the angle of the optical axis with respect to the surface is usually substantial, ranging from 25 to 60 degrees. The term O-plate refers to this oblique orientation of the optical axis.

O-plates may have several geometries. They may include configurations where the orientation of the optical axis is substantially constant throughout its thickness. Splayed O-plates have a varying tilt, ranging from a few degrees at the alignment surface to nearly 90 degrees at the air interface. Finally, chiral additives may be included in the coating formulation so that the orientation of the liquid crystals develops a thickness dependent twist in combination with a constant or splayed tilt. Reference herein to "O-plates" can include all of these variations.

Discotic liquid crystal films form via the stacking of negatively birefringent disc shaped liquid crystal molecules. Discotic films occur in various configurations, including uniformly stacked discotic molecules with no tilt between the substrate and the air interface (referred to as a C-plate orientation), or alternatively, in splay configurations where the tilt of the molecules varies from a few degrees at the substrate to nearly 90 degrees at the air interface.

It is important to recognize that the optical properties of nematic and discotic films are vastly different from each other due to their different intrinsic optical symmetries. Consequently, compensator designs that use nematic liquid crystal films are very different from those using discotic liquid crystal films, and are not obvious from each other. Additionally, the optical performance of displays that are compensated using either nematic or discotic films also exhibit significant differences. For example, discotic based films result in compensators for TN displays that have contrast characteristics that are relatively symmetric at both vertical and horizontal viewing angles, but have a pronounced color shift towards yellow with increasing viewing angle. However, nematic based compensators for TN displays typically exhibit lower contrast in one viewing direction but maintain accurate color as viewing angle is increased.

C-plate compensators are films having their optical axes normal to the surface. Most C-plate compensators that are commonly in use for LCDs have negative birefringence. They may include films formed using discotic liquid crystals that are aligned to have uniform orientation throughout the film thickness, films of rigid rod polyimide materials, biaxially stretched films of polystyrene, thick layers of cellulose triacetate (TAC), or multilayer structures of very thin alternating high and low refractive index materials. Negative birefringent C-plate films are useful as components in compensators for TN, VA and other displays types and may be used alone or in combination with other compensation films.

An important characteristic of a liquid crystal alignment film is its ability to readily orient the liquid crystal film in a specific direction, and also to generate a "pretilt" for the aligned liquid crystal. Referring to FIG. 1, pretilt refers to a slight out-of-plane orientation of the liquid crystal molecules, typically a few degrees. For films of nematic liquid crystal materials, a pretilt of several degrees is required to insure that the liquid crystal molecules all orient with their tilt in the same direction (particularly for O-plate, splay O-plates, and twisted O-plate films). Without sufficient pretilt, a liquid crystal film will form with multiple domains and make the film ineffective for compensating a liquid crystal display. Pretilt may not be necessary for A-plates. Polyimide films are common alignment materials used with nematic liquid crystal films and is the primary material used as an alignment film for liquid crystals within the active cell of a liquid crystal display.

Most liquid crystal compensators incorporate an alignment layer coated onto a transparent substrate. Typical transparent substrates are polycarbonate or TAC. Polycarbonate can withstand higher temperatures but is expensive. TAC is less expensive and is the preferred material for most production applications. However, because the acceptable process temperature for TAC is limited by the possibility of heat deformation of the substrate, limits are imposed on the type of alignment materials and the process conditions which may be used such as drying method and temperature. Standard polyimide alignment materials typically require a high curing temperature and is therefore preferably avoided. In addition, the solvents used with most polyimide alignment layers will damage the underlying TAC substrate.

While a particular class of polyvinyl alcohol (PVA) has been developed as an alignment film for discotic liquid crystal compensators (U.S. Pat. Nos. 5,631,051 and 6,726,965) the use of PVA as an alignment film for achieving planar nematic alignment with pretilt has not been described. In particular Ito, et al (U.S. Pat. No. 6,726,965) teaches that rubbed PVA may align a nematic liquid crystal in a vertically aligned orientation, not in a planar orientation. However, as also pointed out by Ito, "Discotic liquid crystal molecules are completely different from rod-like liquid crystal molecules in molecular structures and in optical characteristics. Most of the orientation layers having a function of aligning rod-like liquid crystal molecules are not effective in aligning discotic liquid crystal molecules." Similarly, the ability of PVA to align discotic liquid crystals, or to align a nematic crystal in a vertically aligned state, does not teach its use for producing planar alignment With pretilt in a nematic liquid crystal film. Ito also teaches that a compensator having positive birefringence is not effective in compensating the wide viewing angle characteristics of a twisted nematic display, which is a further subject of the current invention.

SUMMARY

This invention includes the use of a cross-linked polyvinyl alcohol (PVA) as an alignment film that, upon rubbing, has the capability to produce planar alignment, with pretilt, of nematic liquid crystal molecules. PVA materials are inexpensive, and can be used as the alignment layer for fabrication of compensator assemblies, such as O-plate, splay O-plate, splay/twist-O-plate and A-plate compensators. This material can also be used for aligning cholesteric films and can be used as alignment layers for the liquid crystal material within the active cells of TN and STN LCD's. The cross-linked PVA has the unique property of being capable of aligning a nematic liquid crystal with sufficient pretilt to enable single-domain liquid crystal-based compensation films.

An additional feature of this invention is that films of the PVA material incorporating features of the invention are observed to exhibit small out-of-plane negative, substantially uniaxial birefringence (approx. −0.005). Therefore, a PVA film of sufficient thickness can be used as a negative C-plate compensator, either as stand-alone components or as an alignment film for a nematic liquid crystal based compensator film.

The small out of plane negative substantially uniaxial birefringence produces a retardation of appropriately 10 nm for each 25 µm of physical thickness. Therefore, one can pick the retardation desired for an assembly by varying the thickness of the film. A cross-linked PVA film of sufficient thickness, usually greater than about 10 µm, on a transparent substrate may be used as a uniaxial negative C-plate compensator. This PVA film may exhibit some small degree of biaxial symmetry but may be used in various compensator film combinations that require a negative C-plate component. On the other hand, PVA alignment films having a thickness of less than about 10 µm can be treated as substantially isotropic films in compensator designs.

A TAC substrate film can introduce some negative C-plate character to a compensator structure. However, TAC for inclusion in a coated compensator structure is commonly available in only certain thicknesses that might not provide sufficient retardation for a specific compensator design and thick optical quality TAC substrates are expensive. Additional negative C-plate retardation can be achieved through the use of a thick PVA film incorporating features of the invention. Examples of compensator structures that benefit from the use of thick PVA alignment films are combinations of PVA with positive birefringent splay O-plates for TN displays, and thick PVA alignment films combined with positive birefringent A-plates for vertically aligned (VA) displays.

DETAILED DESCRIPTION

An alignment layer or film incorporating features of the invention comprises a cross-linked PVA film formulated such that, upon rubbing of a first surface of that film, it is capable of aligning nematic liquid crystal molecules (including those having a chiral additive to induce twist) in a film on the alignment layer with pretilt for use as LCD compensator films such as A-plates, O-plates, splay O-plates, twist/splay O-plates, A-plates and cholesteric films. The PVA film has applications as both an alignment layer and, when thicker than about 10 µm, functioning as a negative birefringent C-plate component of an optical compensator for liquid crystal displays. It may also be used as the internal alignment layers for TN, STN, and other LCD's employing nematic or chiral liquid crystals. The cross-linked PVA alignment layer is also useful for the fabrication of multiple layer liquid crystal compensators because it can be coated via solvent casting onto a previously formed polymerized liquid crystal compensator layer without dissolving the previously coated layer. This enables the fabrication of a multilayer liquid crystal film structure through successive coating of alignment and liquid crystal film layers, thus avoiding the need to laminate multiple films. This is not feasible with commonly used polyimide alignment materials because the solvents commonly used for polyimides would dissolve a previously coated polymerized liquid crystal film layer.

The broad applicability of various aspects of the invention is demonstrated by the examples provided below.

Polyvinyl alcohol (PVA), a highly polar and hydrophilic synthetic resin, is produced by polymerization of vinyl acetate followed by hydrolysis (saponification) of polyvinyl acetate (PVAC). The saponification rate is defined as the degree of hydrolysis in PVA and signifies the extent of conversion of the PVAC to the PVA. The degree of polymerization determines the molecular weight and viscosity of the PVA in solution. Degree of hydrolysis and molecular weight affects the water sensitivity and water solubility of PVA films. Further, PVA can be cross-linked to further increase its water resistance. Glyoxal, urea-formaldehyde, and melamine-formaldehyde are examples of commonly used cross-linking agents.

Polyvinyl alcohol (PVA), particularly crosslinked PVA, is a transparent anisotropic material. Films of PVA exhibit a uniaxial negative birefringence and/or biaxial behavior (substantially uniaxial with substantially negative C-plate symmetry). Polyvinyl alcohol, doped with a cross-linking agent, when used as a substitute for a polyimide alignment layer, has been found by applicant to produce a lower cost, more easily formed liquid crystal film-based compensator assembly. A unique feature of the PVA material disclosed herein is its ability to align nematic liquid crystal molecules with pretilt, enabling its use as an alignment film or substrate for a polymerized liquid crystal film. In addition, referring to the C-plate 607, 622 of FIG. 6, the negative uniaxial C-plate behavior of a thick film of the cross-linked PVA can enable its use as the negative C-plate compensator component as is desirable for several LCD compensator designs. This combined compensator improves the contrast and color stability of twisted nematic (TN) liquid crystal displays.

Combining an A-plate with the thick PVA alignment layer, having a thickness adequate to create a retardation of about 200 nm to at least about 400 nm, creates a compensator structure that improves the performance of a vertically aligned liquid crystal display. The negatively birefringent C-plate symmetry (optical axis perpendicular to the film surface) of a thick PVA alignment layer improves contrast in both the horizontal and vertical directions of a vertically aligned liquid crystal display. More recently, liquid crystal "microdisplays", including liquid crystals on silicon (LCOS) displays have been developed for rear projection televisions. Combining an A-plate with the PVA alignment layer creates a compensator that improves the performance of the liquid crystal projection system by increasing the overall optical contrast.

An additional benefit of a cross-linked PVA film incorporating features of the invention is that polyvinyl alcohol is water-soluble and therefore a TAC substrate is not affected by the alignment film solvent. Further, the PVA can be cured and cross-linked at low temperatures that are compatible with coating on TAC. Cross linking fully hydrolyzed PVA then decreases the solubility of the PVA film in water, making the assembled structure more water resistant. The PVA can be readily applied, and the compensator fabricated using standard coating techniques such as conventional web coating methods. One skilled in the art will recognize that various cross-linking agents may be used. However, a preferred cross-linking agent is CYMEL® 350 resin (Cytec Industries, Inc.), which is a highly methylated, monomeric melamine formaldehyde resin.

The PVA alignment layer is inexpensive, and can be used instead of polyimide for fabricating various components of an LCD, including nematic liquid crystal based compensators or as the liquid crystal alignment layer within the liquid crystal cell. The PVA alignment layer is useful for fabricating compensators comprising multiple polymerized liquid crystal A-plate and O-plate compensators since it can be cast onto an already aligned compensator layer without dissolving the previously deposited compensator layers, thus also acting as a capping layer and allowing for multiple adjacent A-plate and O-plate layers to be fabricated monolithically, without lamination. Additionally, the PVA alignment layer when deposited as a thick film within a multiple layer polymerized liquid crystal compensator structure, can act as a negative birefringent C-plate compensator layer. Eliminating or reducing the need for polyimide and film transfer lamination significantly reduces material and labor costs, reduces defects due to film transfer lamination and, as a result, increases production yields and the production rate. These and other features and advantages of the invention will be apparent to those skilled in the art.

An illustrative embodiment of the invention is described below using solvent casting techniques to deposit obliquely oriented (e.g., O-plate) compensator elements on a transparent substrate (e.g. glass or plastic) with an alignment layer.

Figure 2:
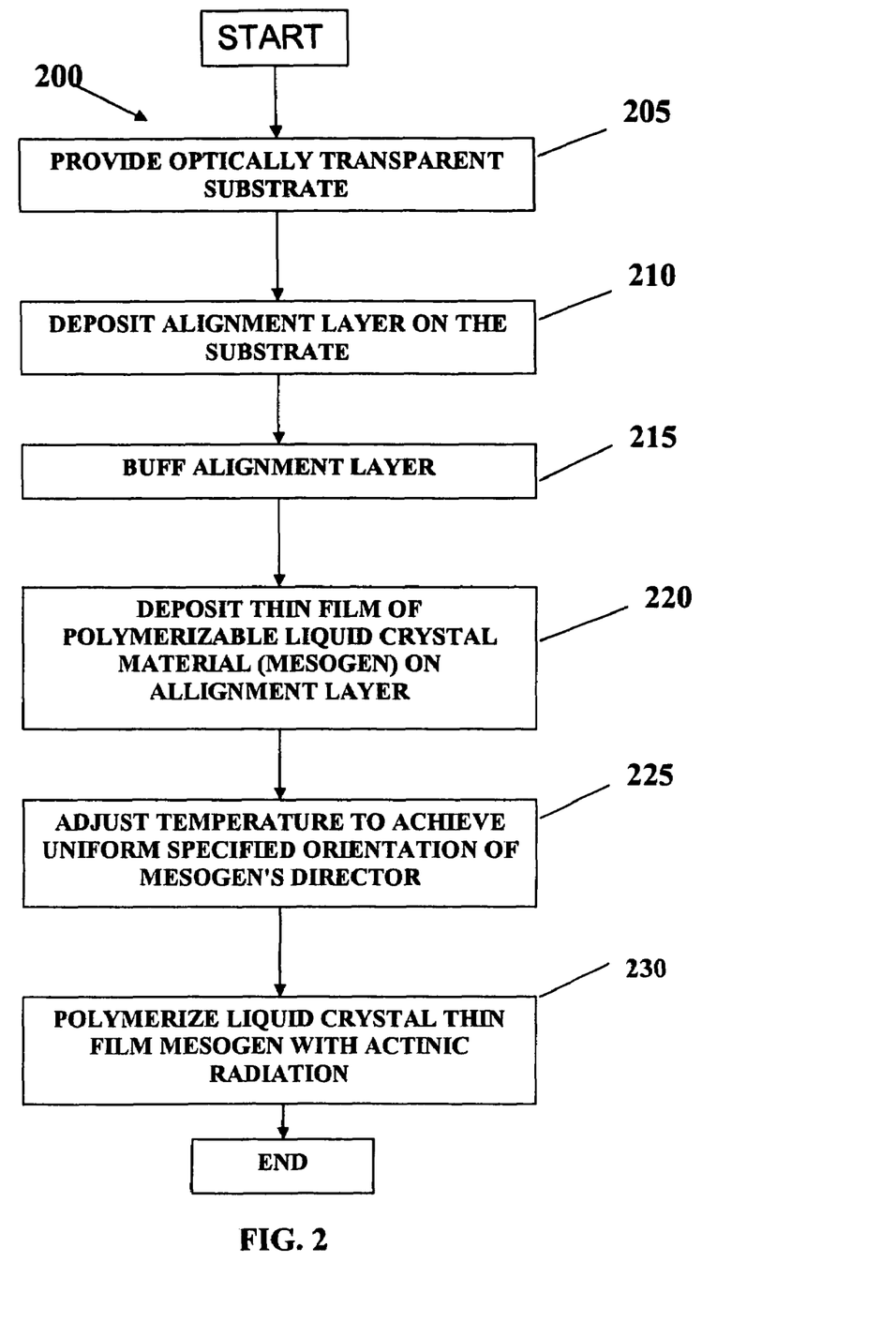
FIG. 2 is a flow chart illustrating a method for preparing a splayed O-plate compensator on a PVA alignment layer.

FIG. 2 is a high-level flow chart 200 showing an example of a process for fabricating a splayed O-plate compensator using the PVA alignment layer in accordance with the invention.

1) An optically transparent substrate is provided 205. The substrate can be either glass or plastic and may be one of the plates that form the display's liquid crystal cell. Typical glass substrates are comprised of silicate or soda lime glass, with approximate thickness of 0.5 to 1.1 millimeters (mm). Typical plastic substrates can vary in thickness from approximately 40 to 200 micrometers (μm). Alternatively, plastic substrates may be comprised of any suitable polymer material such as Triacetyl cellulose (TAC).

2) A liquid crystal alignment layer is formed from a cross-linkable polyvinyl alcohol (PVA) polymer material deposited onto the substrate 210. The term "deposit" is intended to include any convenient deposition or coating technique in which a layer is formed in-place on a substrate and is also intended to encompass situations in which the material is deposited onto one or more intermediate layers which are on the substrate. However it is not intended to include other techniques such as lamination, in which a pre-formed layer is bonded to a substrate.

In a preferred embodiment, the PVA layer is solvent cast onto the substrate using standard techniques for film forming. The PVA material is first dissolved in a solvent to form a solution, a thin film of which is then applied to the surface of the substrate. After the solvent is evaporated, a thin film PVA layer material remains on the substrate. For example, a layer of PVA may be applied at room temperature and heated at a temperature of between 80° C. and 120° C. for 5 to 60 minutes to remove the solvent and crosslink the PVA, producing a layer of from about 0.3 to about 200 μm in thickness. However, thicker films up to about 600 μm or greater may also be used without severely effecting the utility of the film. In web coating processes, the drying process can be significantly accelerated.

Suitable solvents include water, alcohol and combinations thereof. Other coating techniques which are compatible with the inventive method include spin-coating, Meier-rod or doctor-bar coating, meniscus coating, and various continuous web coating methods shown in art.

3) One surface of the PVA film is buffed or rubbed to form an alignment layer 215. One of ordinary skill in the art recognizes that buffing or rubbing is a standard method for creating an alignment surface on polyimide films for the purpose of orienting the direction of a liquid crystal layer. This process is applied to the crosslinked PVA film to induce liquid crystal alignment. Further, when buffed the crosslinked PVA film has the unique characteristic of providing pretilt for the subsequently applied liquid crystal layer. This pretilt feature causes nematic liquid crystals at the surface of the alignment film to have a tilt in the orientation of their principal axis of several degrees (2-10 degrees) from the surface of the alignment film. This insures that the liquid crystal film forms in a single crystalline domain over the area of the compensator.

In one embodiment, a buffing cloth comprised of a rayon pile approximately 1.8 mm in height, attached to the outer surface of a 4 inch diameter aluminum cylinder rotating at a speed of approximately 200 to 1,000 revolutions-per-minute is applied to the film. As it rotates, the cylinder moves horizontally across the surface of the alignment layer at a speed of approximately 0.5 to 5.0 centimeters-per-second. The height of the aluminum cylinder above the alignment layer surface is preferably adjusted so that the pile touches the surface of the alignment layer and is deflected by the alignment layer a distance of approximately 0.2 to 0.6 mm.

4) A thin film of polymerizable nematic liquid crystal material is deposited on the buffed alignment layer 220. For certain subsequent operations, the liquid crystal material can contain a photoinitiator such as, for example, approximately 0.5% of Irgacure 651 (available from Ciba-Geigy). Polymerizable liquid crystal materials having a nematic phase suitable for use in the inventive method include, but are not limited to, acrylates, epoxides, and vinyl ethers. The chemical structure of the polymerizable liquid crystal material is selected so that it has an intrinsic pretilt angle θ at its air interface of between 25° and 85° when it is in its nematic phase. That surface of the thin film liquid crystal immediately adjacent to the underlying alignment layer is referred to as the alignment-layer interface; the surface of the liquid crystal thin film exposed to the air is referred to as its air interface. In one embodiment, the polymerizable liquid crystal material RM257 (available from E.M. Industries) is solvent cast onto the alignment layer using cyclohexanone as a solvent so that a thin film layer of RM257 of approximately 1 μm is formed.

5) The temperature of the thin film liquid crystal material is adjusted to achieve a uniform specified orientation of the liquid crystal molecules, e.g., the angle orientation of the liquid crystal molecules, at the alignment surface and throughout the thickness of the film. In one embodiment, the liquid crystal film prepared in step 2) is heated to approximately 90° C. for approximately 30 seconds to 5 minutes depending upon the specific solvent used. Those of ordinary skill in the field will recognize that the specific temperature and time required for this operation is dependent, among other factors, on the liquid crystal material used, its thickness, and the desired pretilt angle, as well as the specific coating process. For example, the time required to achieve the intended liquid crystal alignment can be significantly shorter in web coating processes using forced air drying and heating. In practice, the temperature range for this step can range from room temperature (about 28° C.) to approximately 100° C.

6) The liquid crystal thin film is polymerized in an oxygen-free environment by illuminating it with ultraviolet radiation 230. Oxygen will inhibit the polymerization process and may be excluded by purging the area containing the film with dry nitrogen gas. For example, the liquid crystal film of step 5) is illuminated with ultraviolet light at a wavelength of about 360 nanometers (nm) at approximately 10 milliwatts-per-cm² intensity for approximately 5 minutes. However, the time can be adjusted to produce the designed level of polymerization. As known to those of ordinary skill in the art, the concentration of photoinitiator, the intensity of ultraviolet light, and the duration of exposure are interdependent and subject to modification—the goal being to achieve a high degree of conversion (greater than 80%) of the reactive liquid crystal material.

Figure 3:
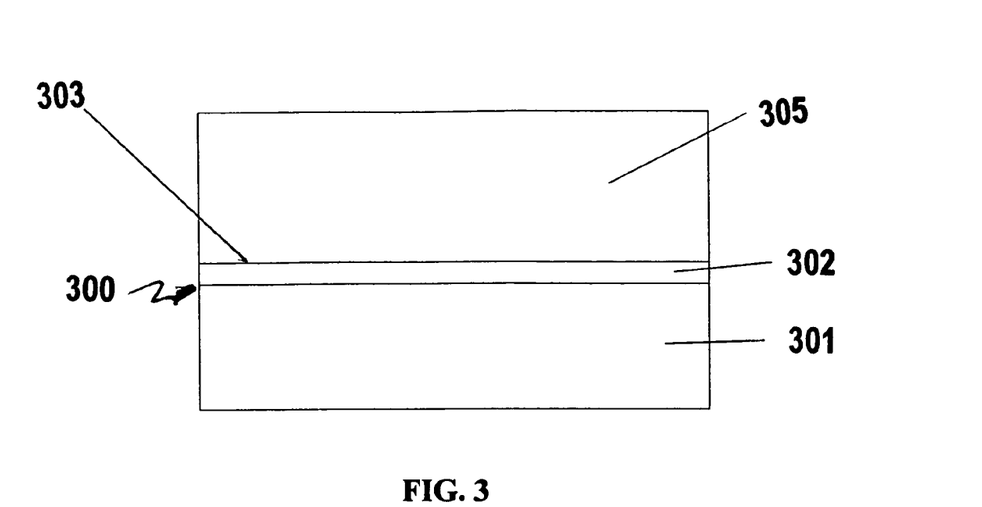
FIG. 3 is a cross sectional representation of a first compensator structure including features of this invention.

FIG. 3 is a schematic cross section of a compensator structure 300 illustrating the features of this invention. The substrate 301 may be either glass or a suitable transparent plastic or polymer film, e.g. triacetyl cellulose (TAC). A thin film of polyvinyl alcohol 302 incorporating features of this invention is deposited on the surface of the substrate. The surface of said PVA film is rubbed with a rayon cloth to generate a suitable alignment surface 303 that also produces liquid crystal pretilt in the subsequently deposited liquid crystal film. The polymerized aligned liquid crystal film 305 is formed on the PVA alignment surface 303, constituting the compensator layer. Polymerized liquid crystal film 305 may be made to have any of several optical symmetries including A-plate, O-plate, splayed O-plate or chiral film.

Figure 4:
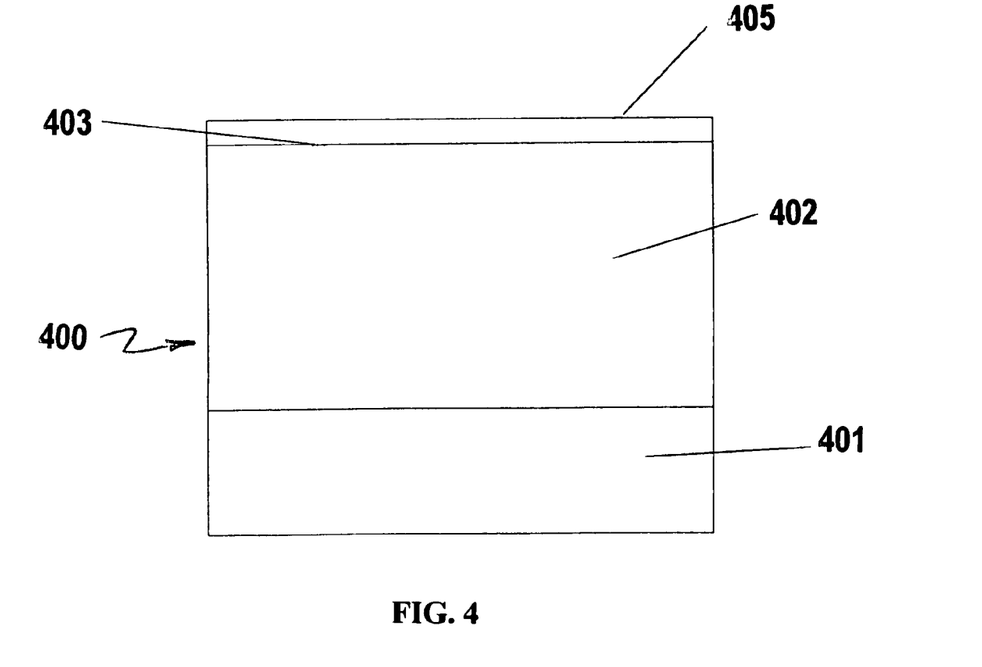
FIG. 4 is a cross sectional view of a second compensator structure including features of the invention wherein the PVA layer serves as an alignment layer for the polymerized liquid crystal compensator films as well as a negative birefringent C-plate compensator layer.

FIG. 4 shows an embodiment of a specific compensator configuration 400 that can be used to improve contrast and color stability over viewing angles for a normally white twisted nematic liquid crystal display. In this case a film greater than about 10 μm thick (preferably 15 to about 80 microns) of PVA 402 is formed on a suitable substrate 401. At these thicknesses the PVA film acts as a negative birefringent C-plate film within the compensator structure. As in FIG. 3, the surface of the PVA layer is rubbed producing a suitable alignment surface 403 for the polymerized liquid crystal film 405. In the specific case of a compensator for a normal white TN display, the polymerized liquid crystal compensator layer 405 may be a splay O-plate having a thickness in the range of 0.5 to 1.4 microns.

Figure 5:
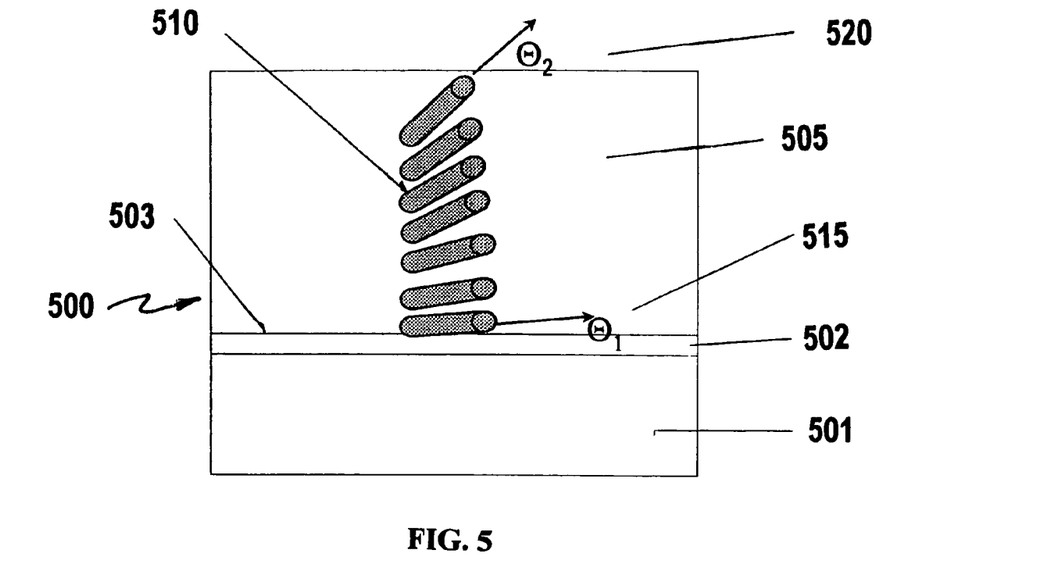
FIG. 5 is a cross sectional representation of a compensator structure including features of the invention illustrating the orientation of the liquid crystal molecules in a polymerized liquid crystal film in a splayed O-plate compensator configuration.

FIG. 5 shows a schematic representation of a splay O-plate compensator film structure 500 illustrating the features of this invention. As in FIGS. 3 and 4, the PVA alignment film 502 is formed on the suitable substrate 501 and rubbed to induce a liquid crystal alignment surface 503 with pretilt. A layer of polymerizable nematic liquid crystal 505 is coated onto the alignment surface. The nematic molecules 510 orient with the rub direction of the alignment surface and assume a small pretilt angle 515 with respect to the plane of the surface. The nematic/air angle 520 of the nematic molecules at the air, or free surface, is determined by the characteristics of the liquid crystal mixture and the process temperature. The pretilt at the alignment surface is critical to establishing preferred alignment bias in the liquid crystal film, insuring that all of the liquid crystal molecules, as in this case, have a splay orientation proceeding in a counterclockwise direction from alignment surface to air surface.

Figure 6:
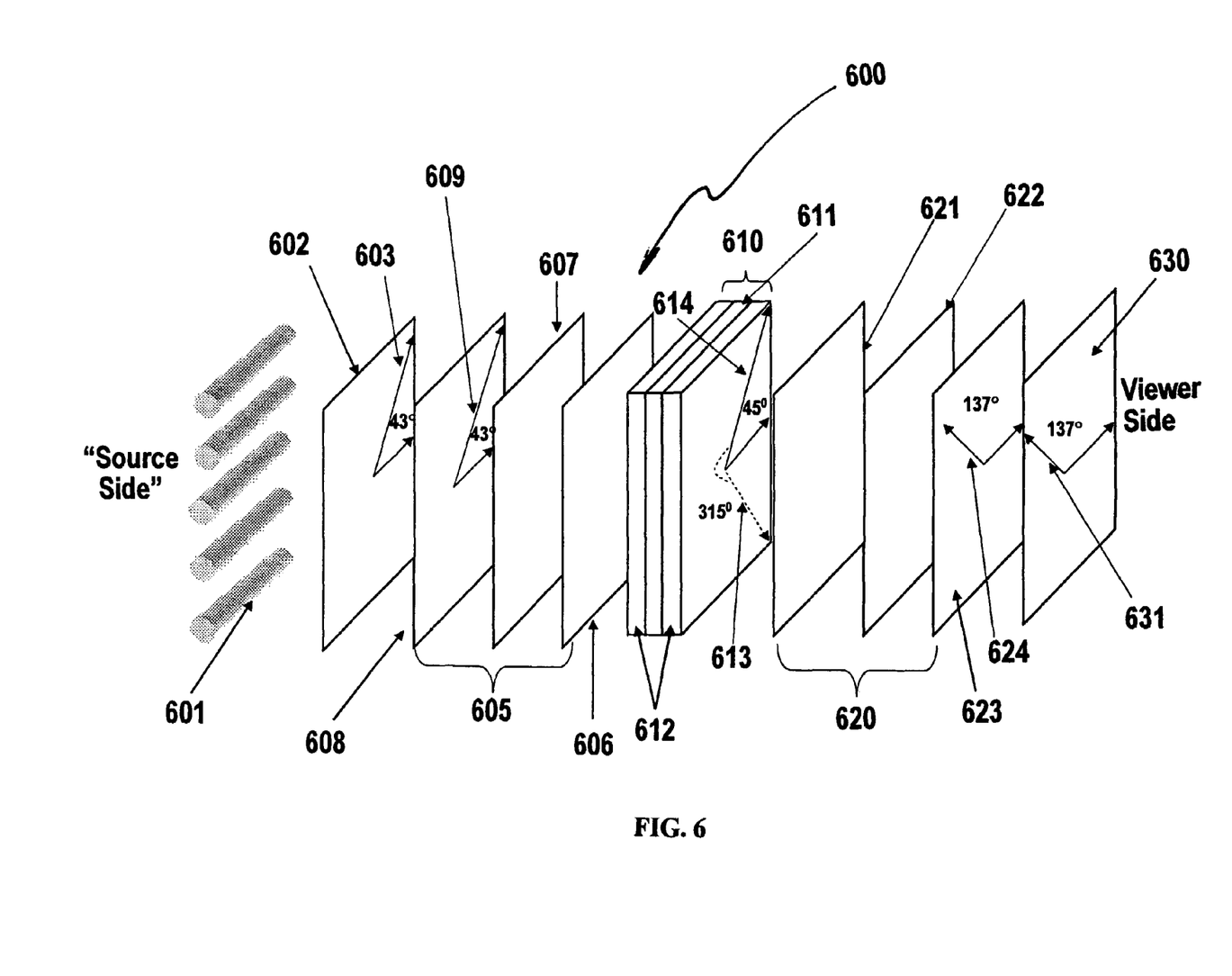
FIG. 6 is a schematic diagram of a liquid crystal display including a compensator fabricated according to the method set forth in FIG. 2 and alignment layers in accordance with the invention.

FIG. 6 is a schematic illustration of a liquid crystal display structure 600 incorporating features of the invention. This embodiment of the structure includes a twisted nematic LCD and a compensator as described herein. Beginning on the side of the display adjacent the rear illumination source 601, the first component is a rear polarizer 602 having an oriented absorption axis 603 followed by a first compensator assembly 605. The first compensator 605 is comprised of a TAC substrate 606, a thick (≦40 μm) crosslinked PVA alignment layer 607, which also acts as a negative birefringent C-plate, and a splayed O-plate 608 with the projection of the optical axis into the plane 609 oriented parallel to the polarizer absorption axis 603 (the optic axis of the liquid crystal polymer is splayed out of the plane of the film from a small pretilt angle, ~2°, to an angle less than about 90° from the plane of the film). The compensator is located on a first side of a liquid crystal cell 610. The liquid crystal cell 610 comprises a twisted nematic liquid crystal material 611 encapsulated between two glass plates 612. The glass plates contain typical liquid crystal display features including color filters, thin film transistor multiplex drive electronics, transparent electrodes and liquid crystal alignment films having rub angles on the source side 613 and viewer side 614. A second compensator assembly 620 is positioned on the front side (viewer side) of the liquid crystal cell 610 having a similar structure to that of the first compensator 605 assembly. This second compensator assembly comprises a TAC substrate 621, a thick cross-linked PVA alignment layer 622, and a splay O-plate film 623 having an optical axis projection 624 oriented parallel to the absorption axis 631 of the viewer side polarizer 630. The front polarizer 630 is also referred to as the analyzer.

The exact thicknesses and orientations of the layers can vary. However, the parameters chosen for the purpose of this illustration are as follows:

TABLE 1

| Preferred Parameters for a Compensated Twisted Nematic (TN) LCD | |
| --- | --- |
| Rear (source side) Polarizer | Polarization axis at 43° |
| Splay O-plate | Thickness = 0.9 µm |
| | Optical axis in plane projection oriented at 43° |
| PVA Alignment Film | Thickness = 45 µm |
| | Rub Direction 43° |
| TAC Film Substrate | Thickness = 80 µm |
| Source side Glass | Thickness approximately 0.5 mm |
| | Alignment rub angle 315° |
| Liquid Crystal | Thickness approximately 5 µm |
| Viewer side Glass | Thickness approximately 0.5 mm |
| | Alignment rub angle 45° |
| TAC Film Substrate | Thickness = 80 µm |
| PVA Alignment film | Thickness = 45 µm |
| | Rub Direction 137° |
| Splay o-plate | Thickness = 0.9 µm |
| | Optical axis in plane projection oriented at 137° |
| Front (viewer side) polarizer | Polarization axis at 137° |

While Table 1 lists the characteristics of a preferred arrangement, other combinations may be used. For example, the absorption axis of the rear polarizer may vary from about 41° to about 48°, the absorption axis of the front polarizer may vary from about 135° to about 139°, the thicknesses of the O-plate may vary from about 0.6 µm to about 1.5 µm, and the thicknesses of the alignment layer may vary from about 1 µm to about 80 µm.

TAC films, which may be used in thicknesses from about 30 µm to about 120 µm thick, exhibit nearly zero in-plane retardance and a negative out-of-plane retardance from about 30 nm to about 120 nm contributing to the total retardation characteristics of the compensator. While TAC is a preferred substrate, other typical material, such as glass plates can also be used as substrates. If an isotropic substrate is used, the necessary negative C-plate retardation component may be obtained by using a suitably thick layer of PVA.

Figure 7:
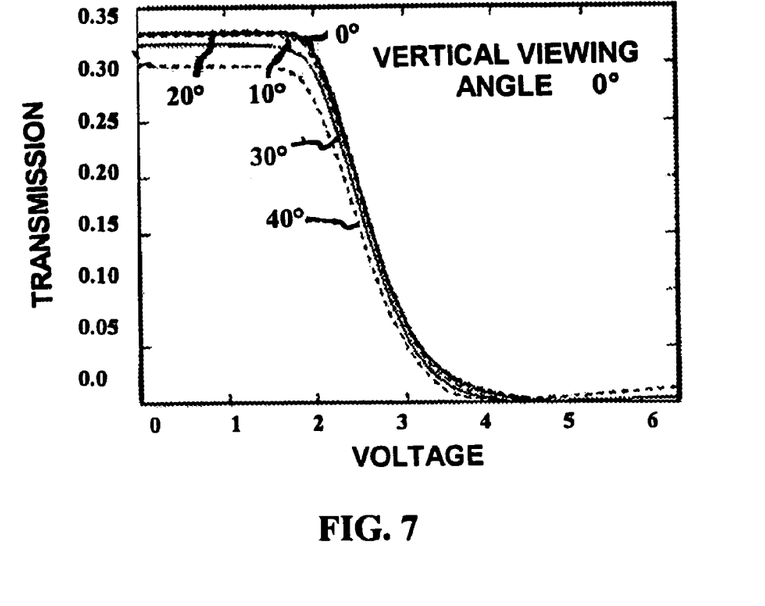
FIG. 7 shows the Transmission versus voltage electro-optic curves for a normally white twisted nematic display without the benefit of a compensator film at 0° vertical viewing angle for various horizontal viewing angles.

FIG. 7 shows the transmission vs. voltage curves for a normally white twisted nematic display without the benefit of the PVA alignment film and compensator of the invention for a range of horizontal viewing angles at a fixed vertical viewing angle of 0°. The curves nearly overlie each other, enabling relatively constant contrast and gray level stability over viewing angles.

Figure 8:
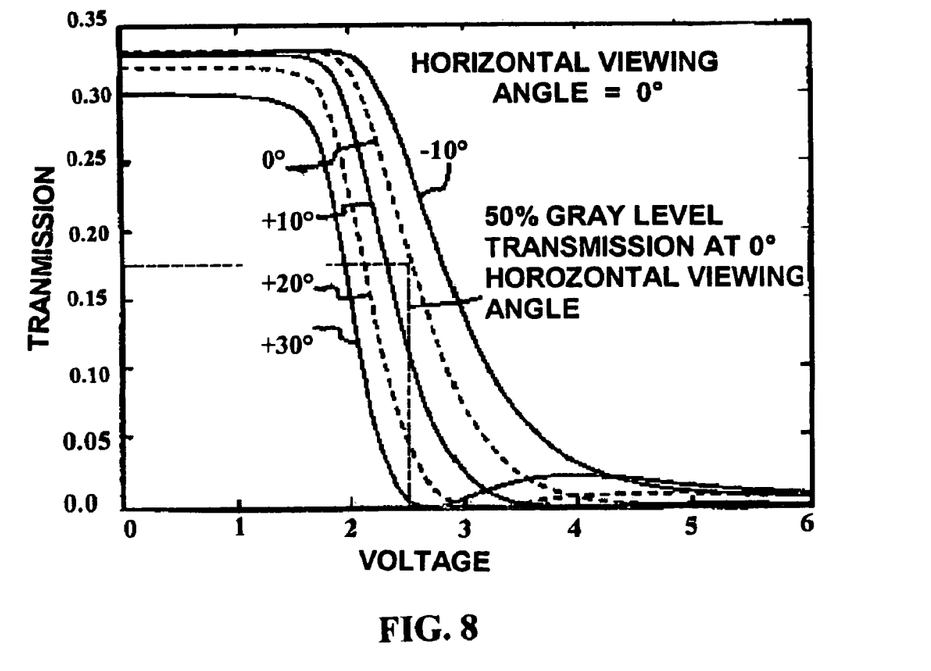
FIG. 8 shows the Transmission versus voltage electro-optic curves for a normally white twisted nematic display without the benefit of a compensator film at 0° horizontal viewing angle for various vertical viewing angles.

FIG. 8 shows the transmission vs. voltage curves for a normally white twisted nematic display without the benefit of the PVA alignment film and compensator of the invention for a range of vertical viewing angles at a fixed horizontal viewing angle of 0°. The large variation of transmission vs. vertical viewing angle at a selected voltage results in significant changes in the appearance of colors that are rendered at intermediate brightness levels, or gray levels, as the vertical viewing direction varies. The rebound in the transmission vs. voltage curve at higher voltages makes selection of an optimum voltage for the black state difficult, resulting in a very limited vertical field of view which has high contrast.

Figure 9:
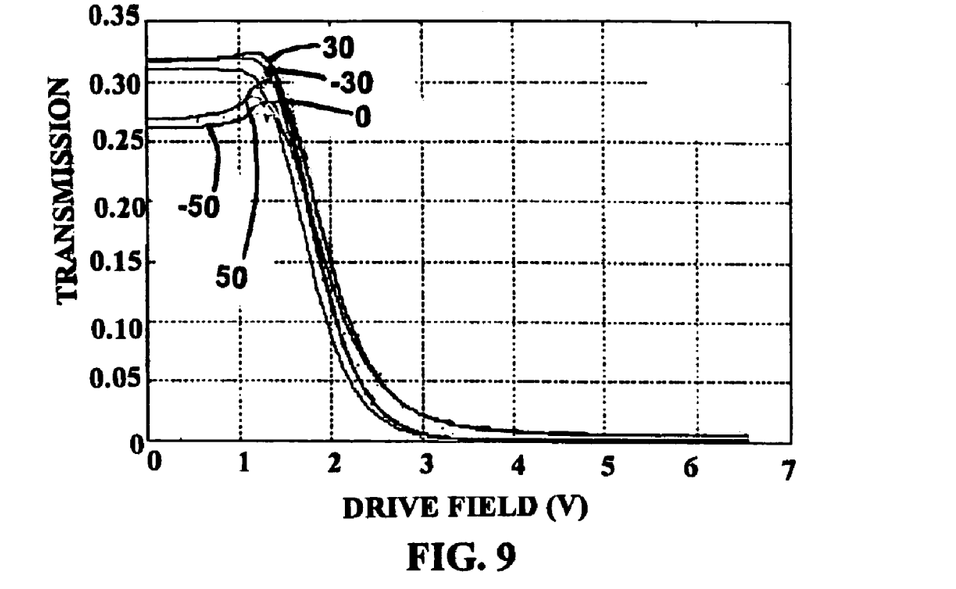
FIG. 9 shows calculated Transmission versus voltage electro-optic curves for a compensated normally white twisted nematic liquid crystal display at 0° vertical viewing angle for various horizontal viewing angles having the configuration of FIG. 6.

FIG. 9 shows the calculated transmission vs. voltage curves for zero vertical viewing angle and various horizontal viewing angles for the display of the configuration shown in FIG. 6 and described in a Table 1 which has the benefit of the compensator as described herein. There is little variation to the shape of the curves with viewing angle and a well define black state can be achieved at voltages greater than 4 V.

Figure 10:
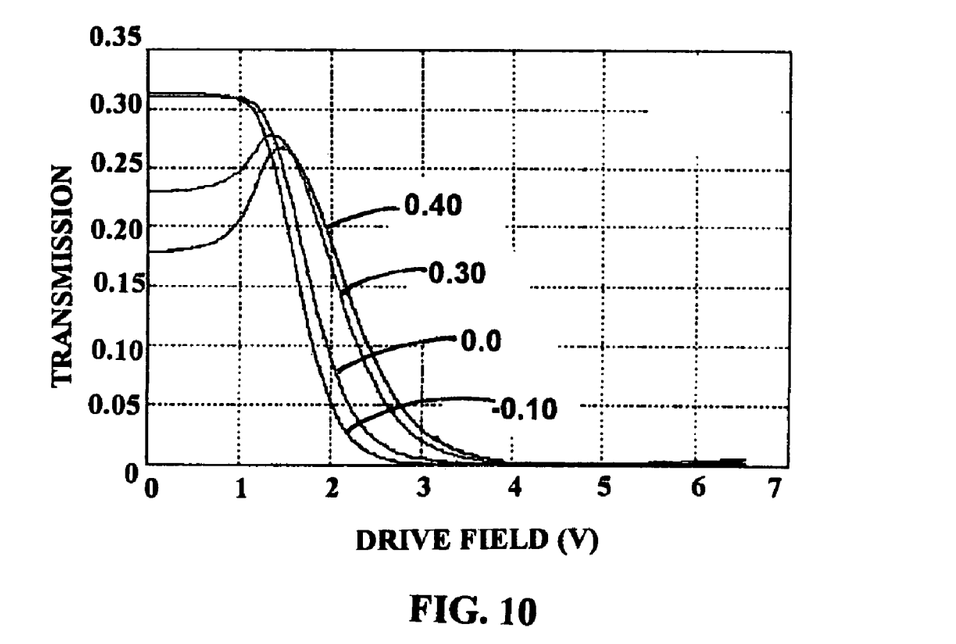
FIG. 10 shows calculated Transmission versus voltage electro-optic curves for a compensated normally white twisted nematic liquid crystal display at 0° horizontal viewing angle for various vertical viewing angles having the configuration of FIG. 6.

FIG. 10 shows the calculated transmission vs. voltage curves for zero horizontal viewing angle and various vertical viewing angles for the display of configuration shown in FIG. 6 and described in a Table 1 which has the benefit of the compensator of this invention. The transmission variation at gray level voltages is reduced and a well defined black state over large vertical viewing angles is achieved for drive voltage greater than 4 V.

Figure 11:
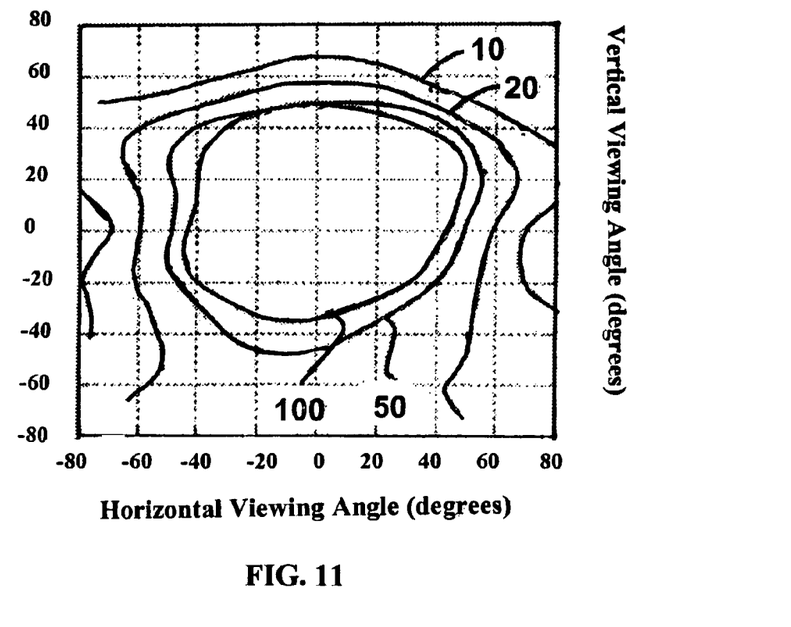
FIG. 11 is a plot, as a function of vertical and horizontal viewing angle, depicting calculated isocontrast contours for the compensated normally white twisted nematic liquid crystal display configuration depicted in FIG. 6.

FIG. 11 is a graph illustrating the contrast contours of a twisted nematic LCD assembly such as shown schematically in FIG. 6 with the parameters listed in Table 1 illustrating that the described structure provides a minimum contrast ratio of 10:1 out to +/−70° in both the horizontal and vertical directions while achieving broad viewing angles with high contrast of greater than 100:1.

Figure 12:
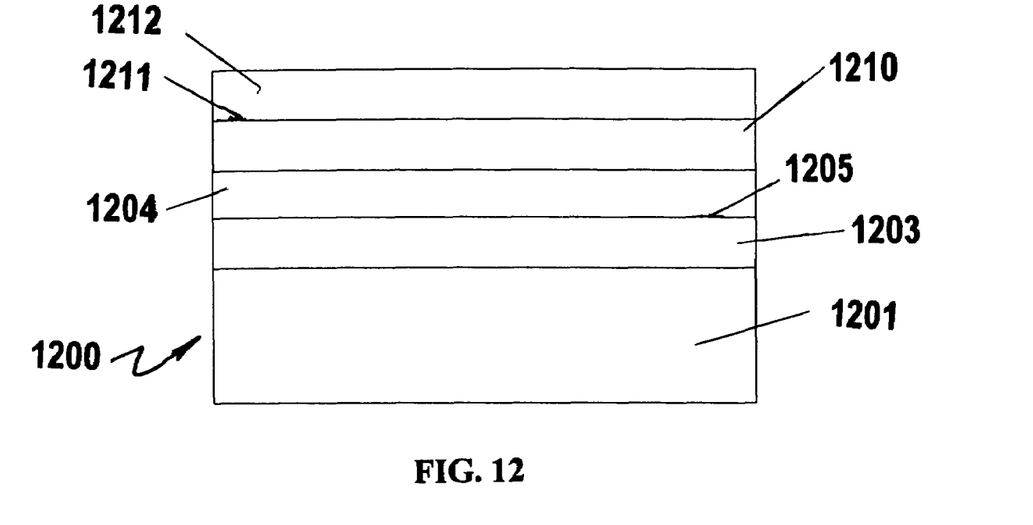
FIG. 12 shows the cross sectional view of a multilayer polymerized liquid crystal compensator structure fabricated using PVA alignment films according to this invention.

FIG. 12 shows a cross sectional representation of a multi-layer polymerized liquid crystal compensator structure incorporating features of this invention. A first PVA alignment film 1203 is applied to a substrate 1201. This first PVA film, 1203, may also be a thick film, contributing to the negative C-plate feature of the compensator. A polymerized liquid crystal compensator film 1204 is formed on the first PVA alignment film 1203 with an alignment surface 1205 on the PVA layer 1203 in contact with the LC compensator film 1204. This assembly provides a structure similar to that shown in FIGS. 3, 4 and 5. A second layer of PVA alignment film 1210 as described herein is then formed on the surface of the first LC compensator film 1204, said film is rubbed to create a second alignment surface 1211 and a second polymerizable liquid crystal compensator film layer 1212 is formed on the second alignment surface 1211. The second PVA alignment film 1210 may also be a thick film, contributing a negative C-plate feature to the compensator assembly. The polymerizable liquid crystal compensator films may be A-plates, O-plates, splay O-plates, or chiral films. The process may be repeated multiple times to create the desired compensator structure.

Figure 13:
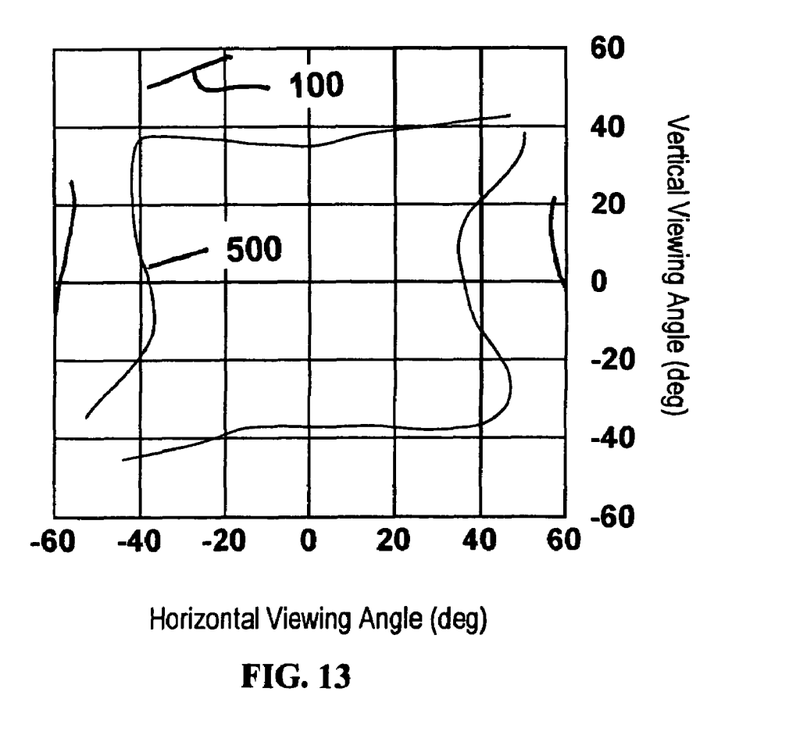
FIG. 13 shows the contrast versus viewing angle for a multidomain vertically aligned display with the benefit of a compensator film in accordance with this invention.

Other compensator embodiments using the features of this invention can be used to improve the viewing angle characteristics of other types of liquid crystal displays. For example, a multidomain vertically aligned (VA) liquid crystal display is known to exhibit an improved viewing angle when a compensator having a large negative birefringent C-plate character (retardation preferably 200 nm-400 nm) together with a positively birefringent A-plate film having low retardation (retardation of 50-200 nm, preferably 80-120 nm) is added. Such a configuration will extend the region of high contrast to large viewing angles with contrast ratios of 500:1 at a viewing angle of about ±40° and 100:1 at viewing angles up to about ±60° as shown in FIG. 13. In this embodiment, the cross-linked PVA film serves as the negative C-plate as well as the alignment film for the A-plate. In the event that the compensator is deposited onto a TAC substrate, the TAC films can comprise some fraction of the C-plate component, the remainder being provided by the cross-linked PVA film.

The PVA film of the invention may also be used as an alignment film and as a retardation component for polymerized liquid crystal films that are used as brightness enhancement films for liquid crystal displays. Polymerized liquid crystal brightness enhancement films use layers of cholesteric liquid crystal materials to transmit a first circular polarization and reflect the other circular polarization. The reflected light is then reflected with polarization change from the rear structure of the display backlight so that it can then be transmitted through the brightness enhancement film. A quarterwave plate on the exit surface of the brightness enhancement film changes the transmitted circular polarization to linear polarization, which is then transmitted through the liquid crystal display polarizer. A brightness enhancement film of this design exhibits a noticeable color change with increasing viewing angle. This can be minimized using the compensator design described in U.S. Pat. No. 5,731,886, incorporated herein by reference, which comprises a negative C-plate compensator combined with an A-plate film. U.S. Pat. No. 5,731,886, describes a device that includes a layer of cholesteric material of the type which transmits light having a first circular helicity and reflects light having a second circular helicity. A quarter-wave plate positioned on a first side of the layer of cholesteric material converts the transmitted light having the first circular helicity into linearly polarized light. A compensator including a positively birefringent C-plate layer is disposed between the layer of cholesteric material and the quarter-wave plate. The compensator reduces undesirable phase effects in the transmitted light introduced by the layer of cholesteric material. The PVA materials and structures described herein may be used as the alignment film for the cholesteric brightness enhancement film, and also as the alignment film, and C-plate component for the brightness enhancement film compensator.

It is evident from the preceding descriptions and embodiments that the PVA materials and structures described herein may be used for a wide range of liquid crystal display arrangements as summarized in Table 2. Compensator embodiments such as those listed in Table 2 incorporating cross-linked PVA films can also be used in other liquid crystal devices (including beam steering and phase compensation devices) as well as other structures incorporating compensator films shown in the prior art.

TABLE 2

COMPENSATOR EMBODIMENTS IN LIQUID CRYSTAL DISPLAYS

| Compensator Configuration | Liquid Crystal Cell Type |
| --- | --- |
| PVA alignment film + A-plate | Vertically Aligned (VA) display, Super Twist Nematic (STN) display, Liquid Crystal Projectors |
| PVA alignment film + o-plate | Twisted Nematic (TN) display |
| PVA alignment film + splayed o-plate | TN |
| Thick PVA (c-plate) | TN, VA |
| Thick PVA + A-plate | VA, Liquid crystal projector |
| Thick PVA + o-plate | TN |
| Thick PVA + splay o-plate | TN |
| Multiple layer PVA + compensator film | TN, VA, Electrically controlled birefringence (ECB) display, In-Plane Switching (IPS) display |

Preparation of PVA Material

Described below is a procedure used to prepare a PVA solution and film from that solution for purposes set forth herein.

Reagent grade 98% hydrolyzed PVA with average molecular weight of 18,000, p-toluenesulfonic acid monohydrate, a catalyst for the cross-linking reaction, and glacial acetic acid (99.8%) were obtained from Aldrich chemical. Cross-linking agent Cymel 350 (highly methylated, monomeric melamine formaldehyde) was obtained from Cytec Industries Inc.

One hundred grams of PVA were added to deionized water at room temperature to prepare a solution with a total solids content of 20%. The vial containing the mixture was placed in a hot water bath (90° C.-100° C.) and was stirred until the solution became clear. The PVA solution was cooled down to room temperature.

11.11 g of Cymel 350 were dissolved in deionized water at room temperature to make a 50% solution. P-toluenesulfonic acid monohydrate (3.889 g) was dissolving in deionized water to make a 10% solution of Cymel at room temperature. Glacial acetic acid (10.44 g) was used as received.

The PVA solution and Cymel solution were mixed at room temperature until the PVA/Cymel mixture became clear. The catalyst solution was added to the clear PVA/Cymel solution at room temperature and mixed until the mixture became clear. The glacial acetic acid was then added into the PVA/Cymel350/catalyst mixture and mixed until the solution once more became clear. This solution was then placed in a hot water bath (90° C.-100° C.) and stirred for 1 hour. The solution was cooled down to room temperature. This hot water bath procedure was found to extend the shelf life of the coating solution. Any bubbles trapped in the solution were removed by applying a vacuum to the solution prior to casting the PVA film.

The alignment layer was produced by casting a film, using known techniques, of the above described PVA solution onto a surface of a rigid substrate (glass or Tri Acetyl Cellulose) followed by curing for 30 minutes at 110° C. The alignment layer surface was then rubbed to produce an alignment film which provides a pretilt angle between 2° and 6°. The rubbed surface was cleaned with a low tack adhesive film to remove any contaminant left during the rubbing process. A thin film of a polymerizable liquid crystal monomer such as RM 257, a reactive nematic liquid crystal available from Merck, can then be cast by known techniques onto the alignment layer and dried and cured by heating.

In a typical web casting procedure a roll of transparent substrate material, such as TAC, is continuously advanced through a coating system at a rate of from about 1 to about 100 meters/min. A PVA (molecular weight range from 14,000 to 50,000) solution (approximately 20% PVA in $H_2O$ doped with a cross linking agent) is continuously applied to a first surface of the moving transparent substrate. The solvent is removed and the PVA cross linked by exposure to a flowing stream of 100° C. air. CYMEL 350 (2% w) is an example of a suitable cross-linking agent. As described above, the PVA solution may also include a catalyst, such as p-toluene sulfonic acid monohydrate, a clarifying agent such as acetic acid, as well as adhesion enhancing agents in concentrations recommended by the manufacturers of those compounds. The crosslinked PVA film is then rubbed and a polymerizable nematic liquid crystal functioning as a splayed O-plate is applied over the cured, cross-linked, rubbed PVA film. The process can then be repeated to apply the same or a similar arrangement to the second surface of the transparent substrate. The PVA alignment layer is also useful for fabrication of compensators having multiple O-plate and A-plate layers since it can be cast onto an already aligned and polymerized compensator layer without dissolving that layer, thus acting as a capping layer and allowing for multiple adjacent A-plate and O-plate layers to be fabricated monolithically, without lamination.

Adhesion of the PVA material to the TAC can also be enhanced by first treating the TAC surface with an alkali solution, for example a 0.1 to 3.0 N solution of KOH or NaOH, more preferably in the range of 0.5 to 2.0 N. The temperature of the solution is preferably in the range of room temperature to 90° C., more preferably in the range of 40 to 70° C. Another approach to increasing adhesion between the cross-linked PVA material and the TAC is to add up to about 20%$_w$ of gelatin to the PVA solution.

While the use of a crosslinked PVA film as an alignment device in a compensator assembly has been described in regard to a particular assembly, component arrangement, dimensions and material concentrations, the invention described herein is not intended to be limited to the specific embodiments set forth herein as one skilled in the art will recognize that, based on the teachings set forth herein, the described invention may be applied in different manners and for other uses. For example, applications of the PVA films described herein include, but are not limited to, numerous devices which include an electronically controlled screen display such as television screens and monitors, cell phones, computer displays including lap tops, desk top and portable computer screens, digital cameras, panel displays on equipment, liquid crystal electrooptical devices, beam steering optics, wavefront correction systems and related or similar devices. Also while use with polymerizable liquid crystal materials applied from solvent solutions is disclosed, it is also contemplated that assemblies which utilize the polymerized PVA films can also be used in conjunction with prior polmerized liquid crystal films which can be melt cast to form the assembly.

We claim:

1. A liquid crystal display assembly comprising,
   a) a polarizer adjacent a lighting source, said polarizer having an oriented absorption axis,
   b) a viewer side analyzer having an absorption axis substantially perpendicular to the oriented absorption axis of the polarizer adjacent the lighting source,
   c) a liquid crystal cell comprising a twisted nematic liquid crystal material between the polarizer and the analyzer, and
   d) at least one compensator assembly located between the polarizer and the analyzer, the compensator comprising,
      i) a crosslinked polyvinyl alcohol film with a first surface rubbed to create an alignment layer, and
      ii) a polymeric nematic liquid crystal film on the alignment layer of the rubbed crosslinked polyvinyl alcohol film, said rubbed crosslinked polyvinyl alcohol layer causing a pretilt in the polymerized nematic liquid crystal film
wherein the compensator assembly includes a triacetyl cellulose substrate, a second surface of the polyvinyl alcohol film being in contact with said triacetyl cellulose substrate the triacetyl cellulose substrate having substantially no in-plane retardance and a negative out-of-plane retardance from about 30 nm to about 120 nm.

2. The liquid crystal display assembly of claim 1 wherein at least one compensator assembly is located between the polarizer and the liquid crystal cell and a second compensator assembly is located between the analyzer and the liquid crystal cell.

3. The liquid crystal display assembly of claim 1 wherein the crosslinked polyvinyl alcohol layer has a thickness greater than about 40 μm.

4. The liquid crystal display assembly of claim 1 wherein the crosslinked polyvinyl alcohol layer has a thickness from about 40 μm to about 80 μm.

5. The liquid crystal display assembly of claim 1 wherein said crosslinked polyvinyl alcohol layer also functions as a negative birefringent C-plate.

6. The liquid crystal display assembly of claim 1 wherein the polymeric nematic liquid crystal film has a thickness of from about 0.6 μm to about 1.5 μm.

7. The liquid crystal display assembly of claim 1 wherein the polymeric nematic liquid crystal film has a thickness of about 0.9 μm.

8. The liquid crystal display assembly of claim 1 wherein the polymeric nematic liquid crystal film has an optical axis splayed out of the plane of the film, liquid crystals in said film having a pretilt angle from about 2° to about 8° and being splayed to an angle of from about 50° to about 90° from the plane at the air surface of the film.

9. An optical compensator comprising a crosslinked polyvinyl alcohol film with a rubbed first surface comprising an alignment layer, said alignment layer providing a defined pretilt to an adjacent polymeric nematic liquid crystal film, said optical compensator including a transparent substrate with a second surface of said crosslinked polyvinyl alcohol film on said substrate wherein the substrate is a triacetyl cellulose substrate, a second surface of the polyvinyl alcohol film being in contact with said triacetyl cellulose substrate, the triacetyl cellulose substrate having substantially no in-plane retardance and a negative out-of-plane retardance from about 30 nm to about 120 nm.

10. The optical compensator of claim 9 wherein the crosslinked polyvinyl alcohol film has a thickness of from about 0.3 to about 600 μm.

11. The optical compensator of claim 9 wherein the crosslinked polyvinyl alcohol film also exhibits a negative birefringence and functions as a negative birefringent C-plate.

12. The optical compensator of claim 9 wherein the crosslinked polyvinyl alcohol film has a thickness greater than about 10 μm.

13. The optical compensator of claim 9 wherein the crosslinked polyvinyl alcohol film has a thickness from about 15 μm to about 80 μm.

14. The optical compensator of claim 13 comprising the transparent substrate and multiple layers of a crosslinked polyvinyl alcohol film, each of said multiple layers of the crosslinked polyvinyl alcohol film providing a defined pretilt to an adjacent polymeric nematic liquid crystal film, said optical compensator used in conjunction with a twisted nematic liquid crystal display, a vertically aligned liquid crystal display, an electrically controlled birefringence liquid crystal display or an in-plane liquid crystal switching display.

15. The optical compensator of claim 9 wherein the polymeric nematic liquid crystal film is formed from polymerizable liquid crystal material dissolved in a solvent, said solvent mixture applied to the alignment surface of the crosslinked polyvinyl alcohol film.

16. The optical compensator of claim 9 wherein the polymeric nematic liquid crystal film functions as an A-plate, an O-plate, a splayed O-plate or a chiral film.

17. The optical compensator of claim 9 wherein said polymeric nematic liquid crystal film functions as an A-plate and is used in a vertically aligned liquid crystal display, a super twisted nematic liquid crystal display or a liquid crystal projector.

18. The optical compensator of claim 9 wherein said polymeric nematic liquid crystal film functions as an O-plate or a splayed O-plate and is used in a twisted nematic liquid crystal display.

19. An optical compensator comprising a crosslinked polyvinyl alcohol on a triacetyl cellulose substrate, the triacetyl cellulose substrate having substantially no in-plane retardance and a negative out-of-plane retardance from about 30 nm to about 120 nm wherein the crosslinked polyvinyl alcohol film functions as a negative birefringent C-plate and the optical compensator is used in conjunction with a twisted nematic liquid crystal display or a vertically aligned liquid crystal display.

20. A layered assembly comprising a crosslinked polyvinyl alcohol film with a rubbed first surface comprising an alignment layer, said alignment layer providing a defined pretilt to an adjacent polymeric nematic liquid crystal film, said layered assembly including a transparent triacetyl cellulose substrate, the triacetyl cellulose substrate having substantially no in-plane retardance and a negative out-of-plane retardance from about 30 nm to about 120 nm, a second surface of said crosslinked polyvinyl alcohol film on said substrate wherein said layered assembly is used as a brightness enhancement film, a color filter or a circular polarizer.

21. The layered assembly of claim 20 wherein the polymeric nematic liquid crystal is doped with a chiral compound to induce twist.

22. The layered assembly of claim 20 wherein the polymeric nematic liquid crystal film functions as an A-plate and is used as a brightness enhancement film.

23. A liquid crystal display assembly including an optical compensator comprising a crosslinked polyvinyl alcohol film having first and second parallel surfaces, said first surface comprising an alignment layer provided by rubbing said first surface, and a polymeric nematic liquid crystal film on said alignment layer, the optical compensator including a transparent triacetyl cellulose substrate, the triacetyl cellulose substrate having substantially no in-plane retardance and a negative out-of-plane retardance from about 30 nm to about 120 nm in contact with the second surface of the crosslinked polyvinyl alcohol film, the alignment surface of the crosslinked polyvinyl alcohol film providing a pretilt to liquid crystals in the polymeric nematic liquid crystal film.

24. The liquid crystal display assembly of claim 23 wherein said crosslinked polyvinyl alcohol film has a thickness greater than about 40 μm, said the alignment layer providing a defined pretilt in the polymeric nematic liquid crystal, the crosslinked polyvinyl alcohol film also functioning as a C-plate compensator.

25. The liquid crystal display assembly of claim 24 wherein said polymeric nematic liquid crystal film functions as an A-plate and the liquid crystal display is a vertically aligned display, a super twisted nematic display or a liquid crystal projector.

26. The liquid crystal display assembly of claim 24 wherein the crosslinked polyvinyl alcohol film functions as a negative birefringent C-plate and the liquid crystal display is a twisted nematic display or a vertically aligned liquid crystal display.

27. The liquid crystal display assembly of claim 23 wherein the optical compensator comprises the transparent substrate, multiple layers of a crosslinked polyvinyl alcohol film on said substrate each having a rubbed alignment layer, and multiple polymeric nematic liquid crystal films on the alignment layers, the alignment layers of said multiple layers of the crosslinked polyvinyl alcohol film providing a defined pretilt to adjacent polymeric nematic liquid crystal films, the liquid crystal display comprising a twisted nematic display, a vertically aligned display, an electrically controlled birefringence display or an in-plane liquid crystal switching display.

28. An optical compensator comprising a crosslinked polyvinyl alcohol film having a negative birefringence with the primary symmetry normal to the surface of the film, the crosslinked polyvinyl alcohol film exhibiting a small out-of-plane negative, substantially uniaxial birefringence and producing an optical retardation of about 10 nm for each 25 μm of thickness.

29. An optical compensator comprising a crosslinked polyvinyl alcohol wherein the crosslinked polyvinyl alcohol film functions as a negative birefringent C-plate and the optical compensator is used in conjunction with a twisted nematic liquid crystal display or a vertically aligned liquid crystal display, the crosslinked polyvinyl alcohol film exhibiting a small out-of-plane negative, substantially uniaxial birefringence and producing an optical retardation of about 10 nm for each 25 μm of thickness.

30. A device including an electronically controlled screen display comprising a cross linked polyvinyl alcohol compensator film or a polyvinyl alcohol alignment film used in conjunction with nematic liquid crystal-based compensator films the crosslinked polyvinyl alcohol film exhibiting a small out-of-plane negative, substantially uniaxial birefringence and producing an optical retardation of about 10 nm for each 25 μm of thickness.

31. An apparatus comprising a layer of a crosslinked polyvinyl alcohol material rubbed to produce planar alignment with pretilt in a polymeric nematic liquid crystal material wherein the layer of crosslinked polyvinyl alcohol material exhibits a small out-of-plane negative, substantially uniaxial birefringence and produces an optical retardation of about 10 nm for each 25 μm of thickness.

32. The apparatus of claim 31 wherein the layer of crosslinked polyvinyl alcohol material functions as a negative birefringent C-plate.

33. The apparatus of claim 31 wherein the layer of crosslinked polyvinyl alcohol material is at least about 10 μm thick.

34. The apparatus of claim 31 wherein the polymeric polyvinyl alcohol film is an alignment layer in a polymeric nematic liquid crystal material compensator assembly.

35. The apparatus of claim 34 wherein the compensator assemblies are A-plate, O-plate, splayed O-plate or splay/twist O-plate compensators.

36. The apparatus of claim 31 wherein the polymeric nematic liquid crystal material functions as an A-plate and is used in a vertically aligned liquid crystal display or a chiral doped nematic liquid crystal display.

37. The apparatus of claim 31 wherein the polymeric nematic liquid crystal material functions as an O-plate or a splayed O-plate in a twisted nematic liquid crystal display.

38. The apparatus of claim 31 wherein the liquid crystal material is a twisted nematic material provided by chiral doping and the crosslinked polyvinyl alcohol material provides brightness enhancement to the twisted nematic material.

39. An apparatus comprising a layer of a crosslinked polyvinyl alcohol material wherein the layer of crosslinked polyvinyl alcohol material exhibits a small out-of-plane negative, substantially uniaxial birefringence and produces an optical retardation of about 10 nm for each 25 μm of thickness said apparatus including a nematic liquid crystal layer.

40. The apparatus of claim 39 wherein the layer of a crosslinked polyvinyl alcohol material has a thickness sufficient to function as an optical compensator and a negative C-plate in conjunction with a twisted nematic liquid crystal display or a vertically aligned liquid crystal display.

41. An apparatus comprising a non-aqueous soluble substrate with a polymerized film formed from an aqueous-soluble polyvinyl alcohol material on the non-aqueous soluble substrate, the polymerized film functioning as a compensator or alignment layer for a polymerized nematic liquid crystal display, wherein the substrate is a triacetyl cellulose substrate having substantially no in-plane retardance and a negative out-of-plane retardance from about 30 nm to about 102 nm.

42. A device including an electronically controlled liquid crystal display comprising a compensator assembly including a crosslinked polyvinyl alcohol layer, a crosslinked polyvinyl alcohol compensator, a crosslinked polyvinyl alcohol alignment film or a crosslinked polyvinyl alcohol brightness enhancer, wherein the layer of crosslinked polyvinyl alcohol material exhibits a small out-of-plane negative, substantially uniaxial birefringence and produces an optical retardation of about 10 nm for each 25 μm of thickness.

43. The device of claim 42 including an electronically controlled liquid crystal display, said device comprising a television screen or monitor, cell phone, lap top, portable or desk top computer display screen, digital camera, panel display on equipment, liquid crystal electrooptical devices, beam steering optics and wavefront correction systems.

44. An apparatus comprising a non-aqueous soluble substrate with a polymerized film formed from an aqueous-soluble polyvinyl alcohol material on the non-aqueous soluble substrate, the polymerized film functioning as a compensator or alignment layer for a polymerized nematic liquid crystal display, wherein a polymerized film exhibits a small out-of-plane negative, substantially uniaxial birefringence and produces an optical retardation of about 10 nm for each 25 μm of thickness.

* * * * *